(12) United States Patent
Abhishek

(10) Patent No.: US 10,757,568 B2
(45) Date of Patent: Aug. 25, 2020

(54) SYSTEM AND METHOD FOR COMMUNICATING DIGITAL DATA USING MEDIA CONTENT

(71) Applicant: NAFFA INNOVATIONS PRIVATE LIMITED, Bengaluru (IN)

(72) Inventor: Kumar Abhishek, Bengaluru (IN)

(73) Assignee: NAFFA INNOVATIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/456,545

(22) Filed: Jun. 28, 2019

(65) Prior Publication Data
US 2020/0196138 A1 Jun. 18, 2020

(30) Foreign Application Priority Data
Dec. 18, 2018 (IN) .............................. 201841047929

(51) Int. Cl.
| | | |
|---|---|---|
| *H04L 29/06* | (2006.01) | |
| *H04W 12/00* | (2009.01) | |
| *H04L 9/06* | (2006.01) | |
| *H04L 27/20* | (2006.01) | |
| *H04W 12/12* | (2009.01) | |
| *H04L 27/22* | (2006.01) | |

(52) U.S. Cl.
CPC ....... *H04W 12/0013* (2019.01); *H04L 9/0625* (2013.01); *H04L 27/20* (2013.01); *H04L 27/22* (2013.01); *H04W 12/1204* (2019.01); *H04L 2209/34* (2013.01); *H04L 2209/80* (2013.01)

(58) Field of Classification Search
CPC .. H04W 12/1204; H04L 9/0625; H04L 27/20; H04L 27/22; H04L 2209/34; H04L 2209/80
See application file for complete search history.

(56) References Cited

U.S. PATENT DOCUMENTS

| | | | | |
|---|---|---|---|---|
| 2003/0197782 A1* | 10/2003 | Ashe | ......................... | G07G 1/14 348/150 |
| 2009/0067291 A1* | 3/2009 | Atsmon | .................... | A63H 3/28 367/118 |
| 2013/0294524 A1* | 11/2013 | Van Der Auwera | ......................... | H04N 19/176 375/240.18 |
| 2014/0086307 A1* | 3/2014 | Karczewicz | ........... | H04N 19/70 375/240.02 |
| 2014/0286413 A1* | 9/2014 | Joshi | ...................... | H04N 19/70 375/240.12 |

(Continued)

*Primary Examiner* — Amir Mehrmanesh
(74) *Attorney, Agent, or Firm* — Barry Choobin; Patent 360 LLC

(57) ABSTRACT

The embodiments herein disclose an apparatus and method especially developed for the direct application in transmission involving user devices with some computational potential, allowing data transmission between two devices in a secure manner using media content. The method for the transmission of data between two devices comprises the following steps: receiving a digital data and a media content as input, encoding the digital data, embedding the digital data into a media content, modulating the data using radio frequency (RF) signals, transmitting the modulated RF signals, capturing the modulated RF signals by the receiver module, demodulating the modulated RF signal to obtain an encoded media content and decoding the media content for recovering the digital data.

5 Claims, 4 Drawing Sheets

(56) References Cited

U.S. PATENT DOCUMENTS

2017/0142448 A1\* 5/2017 Karczewicz ........... H04N 19/44
2018/0040293 A1\* 2/2018 He ........................ G09G 5/006

\* cited by examiner

SYSTEM AND METHOD FOR COMMUNICATING DIGITAL DATA USING MEDIA CONTENT

CROSS-REFERENCE TO RELATED APPLICATIONS

The embodiments herein claim the priority of the Indian Provisional Patent Application No. 201841047929 titled "APPARATUS AND METHOD FOR COMMUNICATING DIGITAL DATA USING MEDIA CONTENT", filed on Dec. 18, 2018 and the contents of which are incorporated in entirety by the way of reference.

BACKGROUND

Technical Field

The embodiments herein are generally related to a field of data transmission and network security. The embodiments herein are particularly related to a system and method for secure data transmission through mobile networks. The embodiments herein are more particularly related a system and method for identification of hidden data and for filtering media files that are embedded with malware, spam or sensitive information.

Description of Related Art

Widespread availability and popularity of the mobile devices have made them indispensable in both business and everyday use. These mobile devices include portable computing devices such as laptops, notebooks and tablets that provide mobile computing power as well as access to the information on the Internet, text messaging, email and other functions. Other mobile devices such as wireless phone devices not only provide the aforementioned portable computing functions but further include wireless voice capabilities along with applications using features such as built-in cameras, global positioning satellite (GPS) services and others.

In comparison, the portable computers are not only operated as general purpose computing devices but also like a phone device for delivering phone calls and voice capabilities with protocols/services such as voice-over-IP (VOIP) and Skype™.

Data transmission in a hidden form of machine-readable representation of data is known in the art. Examples of machine-readable representation of data include bar codes, Quick Response (QR) codes and Radio frequency identification (RFID) tags.

Other ways to embed the hidden content in the media files include digital watermarking and steganography. The digital watermarking is a kind of marker covertly embedded in a noise-tolerant signal such as audio or image data. The digital watermarks are only perceptible under certain conditions, such as using some algorithms, and are otherwise imperceptible to the human senses. Both steganography and digital watermarking are configured to employ steganographic techniques to embed data covertly in the noise signals but remain imperceptible to the human senses. Digital watermarks are used to verify the authenticity or integrity of the carrier signal or to show the identity of its owner. It is prominently used for tracing copyright infringements and for banknote authentication.

As media files are configured to carry encoded and hidden data that are imperceptible to human senses, some malware uses these techniques to intrude into the user devices or transfer sensitive information. For example, a malicious web site may distribute a barcode containing URL to the smart phone users and induce the users to scan or decode the barcode. After the barcode is decoded with the smart phone, the smart phone is enabled to launch its web browser and open the malicious website. The website perhaps contain malware that enable among other things, gain access and/or control of the smart phone, disrupt operation of the smart phone and/or gather sensitive information, such as user names and passwords, that are entered into apps and/or websites stored on or entered into the smart phone (e.g.,).

Hence there is need for a secure and efficient method to share and/or transfer data/information. Further there is a need for a system and method for identification of hidden data and for filtering media files that are embedded with malware, spam or sensitive information. Yet there is a need for a system and method for a secure means of data communication between two networked devices. Still there is a need for a system and method for a secure data communication between two networked user devices using media content, without getting affected by malware.

The above-mentioned shortcomings, disadvantages and problems are addressed herein, which will be understood by reading and studying the following specification.

OBJECTIVES OF THE EMBODIMENTS HEREIN

The primary object of the embodiments herein is to provide a secure means for communicating data between two networked devices.

Another object of the embodiments herein is to provide a new communication method between two user devices using media content, so that the communication is not affected by malware.

These and other objects and advantages of the embodiment herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system and method for data transmission in a secure manner using media content between two user devices with some computational potential.

The embodiments herein provide a method and a system to exchange data over the air using media content. The data to be exchanged is received on a transmitter module and encoded. The encoded data is embedded in a media content. The digital representation of the data is modulated in consistent with a modulation protocol using one or more radio transmission frequencies. The radio frequency transmitter is configured to transmit the one or more acoustic carrier signals carrying the modulated data over the air. The data is received at the receiver module in which the data from the radio frequency transmitter is demodulated and decoded to reconstruct the original data.

According to one embodiment herein, a method is provided for the transmission of data between two devices. The method comprises the following steps of receiving a digital data and a media content as input; encoding the digital data using an encoding module; embedding the digital data into a media content; modulating the data using radio frequency (RF) signals using a modulator; transmitting the modulated RF signals using a transmitter module; capturing the modulated RF signals by the receiver module; demodulating the modulated RF signal to obtain an encoded media content and decoding the media content for recovering the original data with a demodulator.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
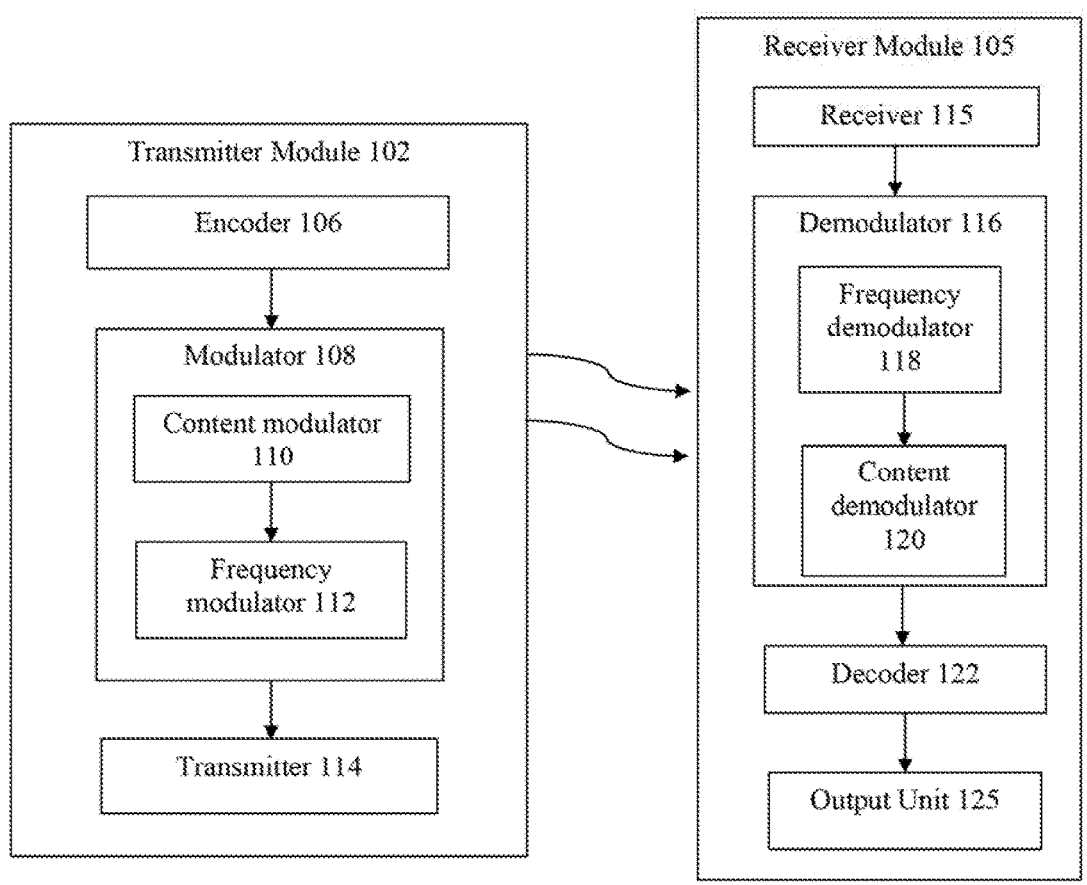
FIG. 1 illustrates a block diagram of a system for communicating digital data using media content, according to one embodiment herein.

Although the specific features of the embodiment herein are shown in some drawings and not in others. This is done for convenience only as each feature may be combined with any or all the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments herein provide a system and method for data transmission in a secure manner using media content between two user devices with some computational potential.

The embodiments herein provide a method and a system to exchange data over the air using media content. The data to be exchanged is received on a transmitter module and encoded. The encoded data is embedded in a media content. The digital representation of the data is modulated in consistent with a modulation protocol using one or more radio transmission frequencies. The radio frequency transmitter is configured to transmit the one or more acoustic carrier signals carrying the modulated data over the air. The data is received at the receiver module in which the data from the radio frequency transmitter is demodulated and decoded to reconstruct the original data.

According to one embodiment herein, a method is provided for the transmission of data between two devices. The method comprises the following steps of receiving a digital data and a media content as input; encoding the digital data using an encoding module; embedding the digital data into a media content; modulating the data using radio frequency (RF) signals using a modulator, transmitting the modulated RF signals using a transmitter module; capturing the modulated RF signals by the receiver module; demodulating the modulated RF signal to obtain an encoded media content and decoding the media content for recovering the original data with a demodulator.

The various embodiments herein provide an apparatus and method for communicating data between two devices connected through a network in a secure manner using media content. According to an embodiment herein, the data is not directly embedded into the RF transmission. The data is embedded into the media content which is further modulated and transmitted as radio frequency (RF) signals.

According to one embodiment herein, Network is a computer network with a small geographic scope. Computer networks with a small geographic regions/area range from NFC to Local Area Networks (LANs). A computer network with a small geographic region typically does not have a connection to the Internet or other remote networks.

According to one embodiment herein, the network is not intended to be limited to a small geographic scope/region, rather network includes a larger networking environment. For example, the network is used for communication among mobile devices themselves (intrapersonal communication) or for connecting to a higher-level network (e.g., the Internet). A wireless personal area network (WPAN) is a Network carried over wireless network technologies such as BLUETOOTH® or peer-to-peer communications over a wireless LAN (Bluetooth is a registered trademark of Bluetooth SIG, Inc.). Network architecture includes one or more information distribution network(s), of any type(s) such as for example, cable, fiber, satellite, telephone, cellular, wireless, etc. The network architecture is configured to have one or more communication channels. According to one embodiment herein, network is configured/enabled to represent a cloud of computers interconnected by one or more networks, where network is a computing system for acting as a single pool of seamless resources when accessed, by utilizing the clustered computers and components.

Figure 2:
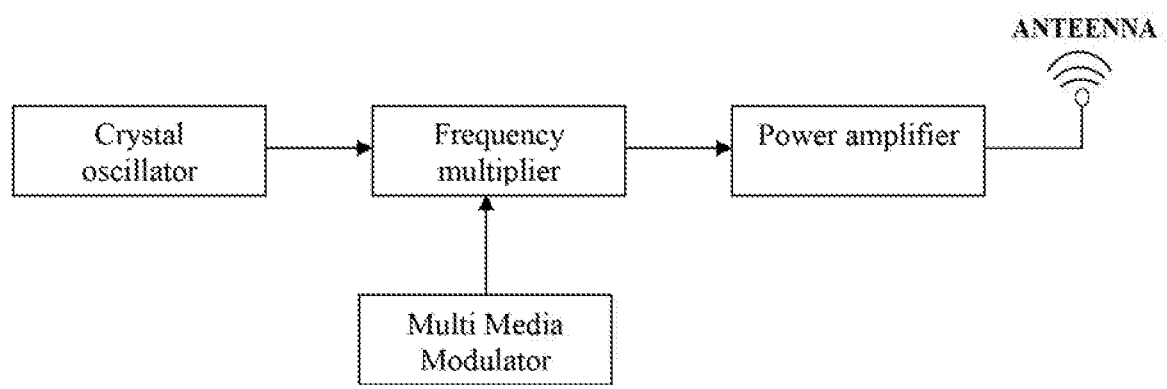
FIG. 2 illustrates a block diagram of a transmitter module for communicating digital data using media content, according to one embodiment herein.
Figure 3:
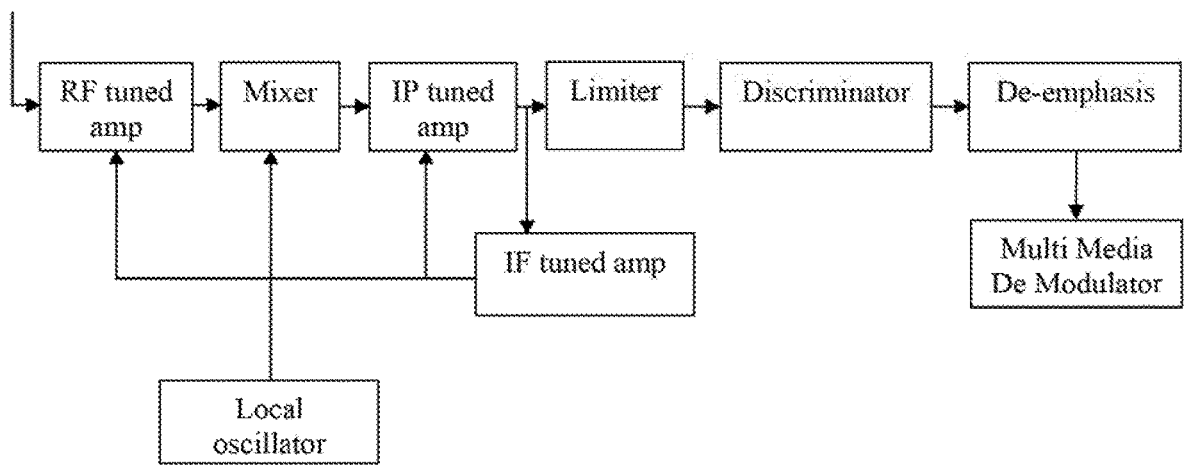
FIG. 3 illustrates a block diagram of a receiver module for communicating digital data using media content, according to one embodiment herein.

FIG. 1 illustrates a block diagram of a system for communicating digital data using media content, according to one embodiment herein, while FIG. 2 illustrates a block diagram of a transmitter module for communicating digital data using media content, according to one embodiment herein. FIG. 3 illustrates a block diagram of a receiver module for communicating digital data using media content, according to one embodiment herein. With respect to FIG. 1-FIG. 3, the system 100 for communicating data between two devices connected through a network in a secure manner using media content, comprises a transmitter module 102 and a receiver module 105. The transmitter module 102 comprises an encoder 106, and a modulator 108 coupled to the encoder 106. The modulator 108 comprises a content modulator 110, a radio frequency modulator 112, and a transmitter 114.

The receiver module 105 comprises a receiver 115 and a demodulator 116 coupled to the receiver 105. The demodulator 116 comprises a radio frequency demodulator 118, a content demodulator 120, and a decoder 122. An output unit 125 is coupled to the decoder 122.

The transmitter module 102 is configured for receiving a digital data and a media content as input. The encoder 106 is configured for encoding the digital data. The content modulator 110 is configured for embedding the digital data into a media content. The frequency modulator 112 is configured for modulating the media content using radio frequency (RF) signals of a predetermined frequency. More particularly, the frequency modulator 112 is configured for modulating the multimedia content with high carrier frequencies.

The transmitter 114 is configured for transmitting the modulated RF signals. The receiver module 105 is configured for capturing the modulated RF signals. The receiver module 105 is a typical FM receiver module in which the receiver is tuned to receive RF signals of selected frequency band.

The frequency demodulator 118 is configured for demodulating the media content using radio frequency (RF) signals of a predetermined frequency. The content demodulator 120 is configured for demodulating the modulated RF signal to obtain an encoded media content. The decoder 122 is configured for decoding the media content for recovering the original data/digital data. Accordingly, the encoder 106 scrambles the broadcast signal and the decoder 122 on the media device decrypts the scrambled broadcast.

The output unit 125 is configured for displaying the recovered digital data.

According to one embodiment herein, the content modulator 110 is encoded with a characteristic or preset audio tag known as ToneTag audio tag by using a preset (ToneTag) library. Accordingly, the received multimedia data is demodulated to obtain the (ToneTag) audio data using the preset (ToneTag) library.

The data is encrypted using the encryption standard like AES, DES etc., and the encrypted data is embedded with media file. Then the media file is broadcasted on RF through FM Radio channel. The received content is multimedia data on the receiver side and not the digital data. For detecting/recovering the digital data, the RF received media data is decoded by using a preset (ToneTag) Algorithm that is proprietary or characteristic in nature. The preset (ToneTag) Algorithm is employed to encode and decode the data while maintaining cryptographic standards.

Since the pre-set (ToneTag) algorithm using Phase Shift Keying (PSK) is employed as a modulation technique to modulate digital data into multimedia data, further PSK modulation with RF is restricted. Further, a data compression beyond a predetermined level following digital data encoding is restricted.

Figure 4:
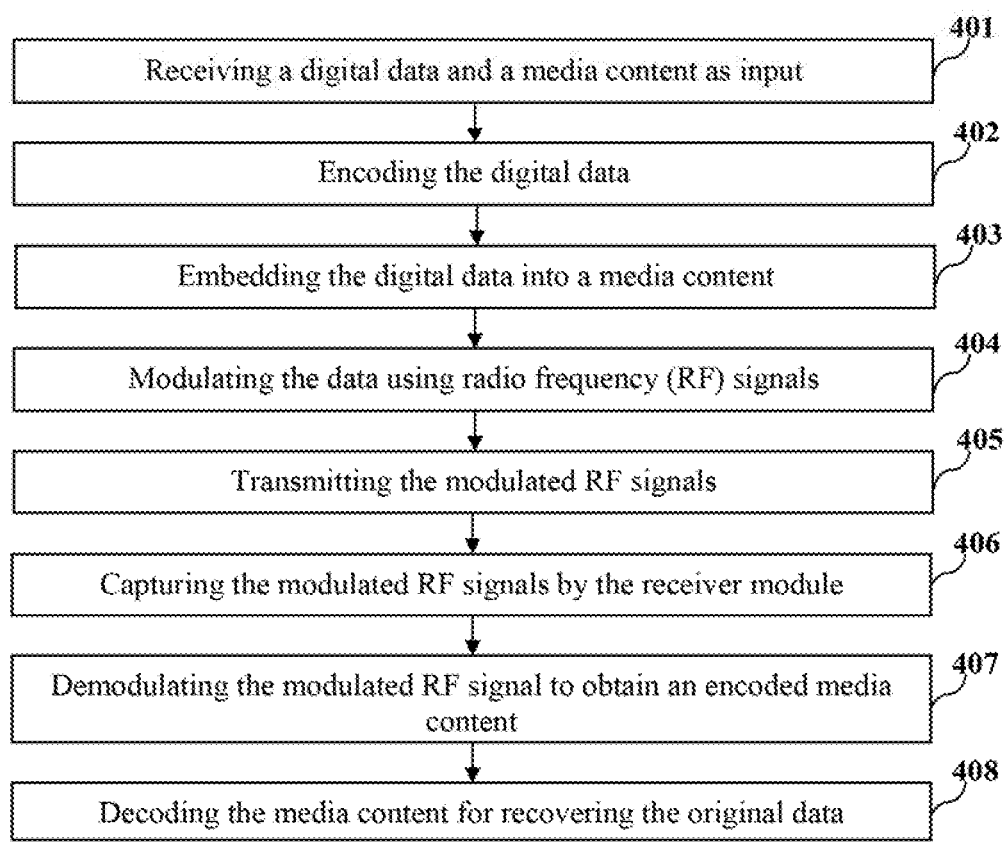
FIG. 4 illustrates a flow chart explaining a method for communicating digital data using medic content, according to one embodiment herein.

FIG. 4 illustrates a flow chart explaining a method for communicating digital data using medic content, according to one embodiment herein. With respect to FIG. 4, the method 400 for the transmission of data between two devices comprises the following steps of receiving a digital data and a media content as input (at step 401), encoding the digital data (at step 402), embedding the digital data into a media content (at step 403), modulating the data using radio frequency (RF) signals (at step 404), transmitting the modulated RF signals (at step 405), capturing the modulated RF signals by the receiver module (at step 406), demodulating the modulated RF signal to obtain an encoded media content (at step 407) and decoding the media content for recovering the original data (at step 408).

The various aspects of network are not limited to radio frequency wireless communications. Rather, communication is accomplished via any known mediums in the art, including but not limited to, acoustic mediums, and optical mediums, such as, visible or infrared light or ultrasound. For example, the data exchanged between devices, is transmitted via infrared data links using well known technologies, such as infrared transceivers included in some mobile device models.

The embodiments herein are provided as a computer program product, which includes a machine-readable storage medium tangibly embodying thereon instructions, which are used to program a computer (or other electronic devices) to perform a process. The machine-readable medium includes, but not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, the embodiments herein are also downloaded as one or more computer program products, wherein the program is transferred from a remote computer to a requesting computer by way of data signals embodied in a carrier wave or other propagation medium via a communication link (e.g., a modem or network connection).

The various embodiments, recite the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. The various methods described herein are practiced by combining one or more machine-readable storage media containing the code according to the embodiment herein with appropriate standard computer hardware to execute the code contained therein. An apparatus for practicing various embodiments of the embodiment herein involves using one or more computers (or one or more processors within a single computer) and storage systems containing or having network access to computer program(s) coded in accordance with various methods described herein, and the method steps of the invention is accomplished by modules, routines, subroutines, or subparts of a computer program product.

Notably, while the embodiments herein are described/explained using modular programming terminology, the code implementing various embodiments herein are not so limited. For example, the code is also configured to reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Although the embodiments herein are described with various specific embodiments, it is obvious for a person skilled in the art to practice the embodiments herein with modifications.

The embodiments herein provide one or more of the following advantages. Use of data communication of the embodiment herein provides secure and efficient method of communication between networked devices.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for communicating digital data between two communication devices, the apparatus comprising:
   a transmitter module configured for receiving a digital data and a media content as input, and wherein the transmitter module comprises:
   an encoder configured for encoding the digital data and embedding an encoded digital data into the media content;
   a modulator configured for modulating the media content using radio frequency (RF) signals of predetermined frequency, and wherein the modulator comprises a content modulator and a frequency modulator, and wherein the content modulator is encoded with a characteristic or pre-set audio tag stored in a pre-set audio library using a pre-set algorithm, and wherein the frequency modulator is configured for modulating the media content using any one of Phase Shift Keying (PSK), Binary Phase Shift Keying (BPSK), Quaternary Phase Shift Keying (QPSK) modulating techniques; and
   a transmitter configured for transmitting the modulated RF signals;
      a receiver module communicatively coupled to the transmitter module and configured for receiving the modulated RF signals, and wherein the receiver module comprises:
      a demodulator configured for demodulating the media content using radio frequency (RF) signals of a predetermined frequency, and wherein the demodulator comprises a content demodulator and a frequency demodulator, and wherein the content demodulator is decoded with a characteristic or pre-set audio tag stored in a pre-set audio library using a pre-set algorithm;
      a decoder configured for decoding the media content for recovering the digital data; and
   an output unit configured for displaying the recovered digital data.

2. The system according to claim 1, wherein the encoder is configured for encrypting the digital data using any one of the encryption techniques including Digital Encryption Standard (DES).

3. The system according to claim 1, wherein the frequency demodulator is configured for demodulating the media content using any one of the PSK, BPSK and QPSK techniques.

4. A method for transmission of data between two communication devices, the method comprising steps of:
   receiving a digital data and a media content as input with a transmitter module;
   encoding the digital data with an encoder;
   embedding the digital data into a media content using a content modulator provided in a modulator, and wherein the content modulator is encoded with a characteristic or pre-set audio tag stored in a pre-set audio library using a pre-set algorithm;
   modulating the data using radio frequency (RF) signals of predetermined frequency using a frequency modulator, and wherein the frequency modulator is configured for modulating the media content using any one of Phase Shift Keying (PSK), Binary Phase Shift Keying (BPSK), Quaternary Phase Shift Keying (QPSK) modulating techniques;
   transmitting the modulated RF signals with a transmitter;
   capturing the modulated RF signals by the receiver module;
   demodulating the media content using radio frequency (RF) signals of a predetermined frequency by a frequency demodulator;
   demodulating the modulated RF signals to obtain an encoded media content with a content demodulator, and wherein the content demodulator is decoded with a characteristic or pre-set audio tag stored in a pre-set audio library using a pre-set algorithm; and
   decoding the encoded media content for recovering the digital data.

5. The method as claimed in claim 4, comprises displaying the digital data with an output unit.

* * * * *